US012518607B1

(12) United States Patent
Gal (10) Patent No.: US 12,518,607 B1
(45) Date of Patent: Jan. 6, 2026

(54) CUT CABLE DETECTION SYSTEM

(71) Applicant: Samsara Inc., San Francisco, CA (US)

(72) Inventor: David Gal, Oakland, CA (US)

(73) Assignee: Samsara Inc., San Francisco, CA (US)

( * ) Notice: Subject to any disclaimer, the term of this patent is extended or adjusted under 35 U.S.C. 154(b) by 40 days.

(21) Appl. No.: 18/435,201

(22) Filed: Feb. 7, 2024

(51) Int. Cl.
*G08B 13/22* (2006.01)
*E05B 73/00* (2006.01)

(52) U.S. Cl.
CPC .......... *G08B 13/22* (2013.01); *E05B 73/0029* (2013.01)

(58) Field of Classification Search
CPC .................. G08B 13/22; E05B 73/0029
USPC ............................................ 340/572.9
See application file for complete search history.

(56) References Cited

U.S. PATENT DOCUMENTS 5,748,083 A * 5/1998 Rietkerk .............. G08B 13/128
340/687
2011/0248853 A1* 10/2011 Roper ................. G08B 21/0286
340/573.4
2015/0022359 A1* 1/2015 Joseph .................... E05B 45/06
340/572.9

* cited by examiner

*Primary Examiner* — Kam Wan Ma
(74) *Attorney, Agent, or Firm* — Schwegman Lundberg & Woessner, P.A.

(57) ABSTRACT

A system and method for tamper detection in wired tracking devices uses an identification mechanism embedded in a connecting cable, displaced from the tracking device. An asset tracking device attached to a trailer periodically tests for presence of the identification mechanism at the opposite end of a connecting cable. Identification mechanisms can embed in cable wiring or use discrete components. A missing identification mechanism indicates cable tampering. By implementing the identification mechanism to the far end of the cable, intentional cable cuts can be distinguished from routine power loss. Rapid notification of tampering events allows timely tracking device recovery and repair. Cost-effective deployment uses existing tracking device hardware and firmware functionality, only modifying cable assembly. Broad applicability ranges from vehicles and trailers to remote containers and assets. Theft prevention and detection capabilities are enhanced without added hardware expenses.

20 Claims, 6 Drawing Sheets

ASSOCIATING A TRACKING DEVICE WITH AN ASSET, THE TRACKING DEVICE COMPRISING A CABLE THAT CONNECTS THE TRACKING SYSTEM WITH AN ELECTRICAL SYSTEM OF THE ASSET
302

IMPLEMENTING AN IDENTIFICATION MECHANISM THAT INDICATES INTEGRITY OF THE CABLE, THE IDENTIFICATION MECHANISM BEING IMPLEMENTED AT A POSITION OPPOSITE OF THE TRACKING DEVICE ALONG THE CABLE
304

CAUSING THE TRACKING DEVICE TO DETECT A PRESENCE OF THE IDENTIFICATION MECHANISM AT THE POSITION OPPOSITE THE TRACKING DEVICE WITHIN THE CABLE BASED ON A CRITERIA
306

PRESENTING A NOTIFICATION BASED ON THE PRESENCE OF THE IDENTIFICATION MECHANIMS AT THE POSITION OPPOSITE THE TRACKING DEVICE ALONG THE CABLE
308

```
┌─────────────────────────────────────────────────────────────┐
│  DETECTING A MISSING PRESENCE OF THE IDENTIFICATION MECHANISM │
│                          402                                 │
└─────────────────────────────────────────────────────────────┘
                                │
                                ▼
┌─────────────────────────────────────────────────────────────┐
│  PRESENTING A NOTIFICATION RESPONSIVE TO THE DETECTING THE   │
│                    MISSING PRESENCE                          │
│                          404                                 │
└─────────────────────────────────────────────────────────────┘
```

CUT CABLE DETECTION SYSTEM

TECHNICAL FIELD

The present disclosure relates generally to asset tracking and security systems and methods, and more specifically, to electronic tracking devices for vehicles, trailers, and remote assets that detect tampering or disconnection.

BACKGROUND

Asset tracking devices are often mounted on vehicles, trailers, and other remote assets that tend to be accessible and vulnerable (e.g., parked overnight). Theft and tampering are unfortunately common issues. Thieves are aware that tracking devices may assist in recovery, and often attempt to disable them.

A common asset tracking device configuration relies on wired connectivity to an electrical system on a trailer or asset. Cables provide necessary operating power as well as data connectivity. Tracking devices typically have backup battery systems in case external power is lost.

Sophisticated thieves are aware that severing the cable connection effectively disables live tracking and monitoring. However, from an operations center perspective, it is impossible to distinguish an intentionally cut cable from a vehicle simply being turned off or parked for the night.

What is needed are improved mechanisms for reliably detecting intentional tampering events with cables and connections associated with wired tracking devices. Rapid notification of tampering could dramatically improve tracking reliability and security.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present invention relates generally to improving security and tamper detection in wired tracking devices through novel cable identification mechanism placement. More specifically, techniques are disclosed for reliably distinguishing intentional tampering events from routine power disconnects.

Asset tracking devices are frequently installed in remote, easily accessible locations, making them vulnerable targets for tampering by thieves aiming to disable live tracking. Tracking devices typically rely on cabling to deliver operating power from an asset's electrical system, provide data connectivity, and include backup battery systems.

Sophisticated thieves are aware that severing the cable connection effectively disables tracking capabilities. However, existing systems cannot reliably differentiate an intentionally cut cable from routine events like parking a vehicle for the night.

The present invention solves this problem through the strategic relocation of cable identification mechanisms to the opposite end of connecting cables, farthest from the tracking device. This allows periodic testing to detect a missing identification mechanism, signaling a likely cut cable event.

By detecting events rapidly, asset recovery likelihood improves significantly. What follows is a detailed description of the system components, identification mechanisms, installation procedures, detection algorithms, and notification methods comprising the present invention.

The present system relates to tamper detection in asset tracking devices achieved by strategic placement of cable identification mechanisms. Specifically, by relocating an identification component to the farthest point within a connectivity cable, severed cables can be reliably distinguished from routine power loss events.

According to certain example embodiments, a cut cable detection system may include a tracking device installed or otherwise associated with an asset, such as a vehicle trailer, shipping container, or construction equipment, using mounting brackets, adhesives, wiring harnesses, or other mechanical attachment means. The tracking device may incorporate cellular radios, satellite transceivers, GPS, sensors, microcontrollers, batteries, enclosures, and other standard components familiar to one skilled in the relevant arts.

The tracking system further comprises a cable that connects the tracking system with an electrical system of the asset. Cables and wiring harnesses are commonly implemented in analogous systems to deliver power and facilitate data communications between the tracking device and other on-asset components that comprise the asset's electrical system.

An identification mechanism is implemented within the cut cable detection system via multiple techniques known in the art, including but not limited to: passive resistors, active semiconductor chips, and microcontrollers or integrated circuits with readable memory. In certain example embodiments, the identification mechanism may be implemented at a position opposite of the tracking device within the cable by being intentionally displaced to the farthest reachable point from the tracking device, nearest to the point at which the cable or wiring harness of the tracking device plugs into the electrical system of the asset. In some embodiments, the identification mechanism may provide an identification of a presence of the cable.

Accordingly, the cut cable detection system detects a presence of the identification mechanism leveraging common electrical signaling and testing techniques such as resistance measurement, digital logic levels, bus protocols, and software-based querying using existing tracking device hardware. Periodic testing can be achieved via timed interrupts, trigger events, sleep wake cycles, or operating system task scheduling.

When the tracking device detects a missing presence of the identification mechanism, such as by periodically checking for the identification mechanism and failing to detect it, the tracking device may cause a notification to be displayed on a client device indicating the potentially severed cable. Client devices may include mobile devices running a tracking application, web dashboards, or dedicated devices installed in the cab of a truck for example. Notifications may include conventional alerting methods in tracking systems including SMS, mobile push notifications, emails, and server-side event triggers to dispatch human/automated corrective measures.

Common methods of displaying visual notifications and alerts on client devices are well known in the art, including popup messages, banner notifications, text messages, emails, and status indicators representing a missing identification mechanism, wherein the status indicators may be presented within or upon a map image. Audio and haptic alerts may additionally be incorporated for enhanced conspicuity.

In some embodiments where the identification mechanism presence is missing, indicating a potentially severed cable, the tracking device may additionally activate an internal battery backup system to maintain temporary operation in the absence of standard wired power delivery through the cable. Backup battery systems are routinely integrated into tracking devices to facilitate continued operation and reporting in power loss scenarios. The backup system maintains functionality long enough to report position, alert status, and potentially assist in recovery.

The criteria used to check for the presence of the identification mechanism may follow predetermined temporal patterns such as fixed time intervals, variable schedules, or dynamically determined frequencies. Standard methods of time keeping and interrupt scheduling are known in the art to trigger identification mechanism presence tests.

Additionally, the criteria used may include trigger events to spontaneously test for intact identification mechanism presence and cable continuity. Triggers may include motion, vibration, orientation changes, temperature thresholds, or power anomalies indicative of tampering. The tracking device incorporates accelerometers, gyroscopes, thermometers and voltage monitors to detect trigger criteria.

The cut cable detection system may thereby present a notification based on the presence, or lack thereof, of the identification mechanism. Notifications may include conventional alerting methods in tracking systems including SMS, mobile push notifications, emails, and server-side event triggers to dispatch human/automated corrective measures.

Figure 1:
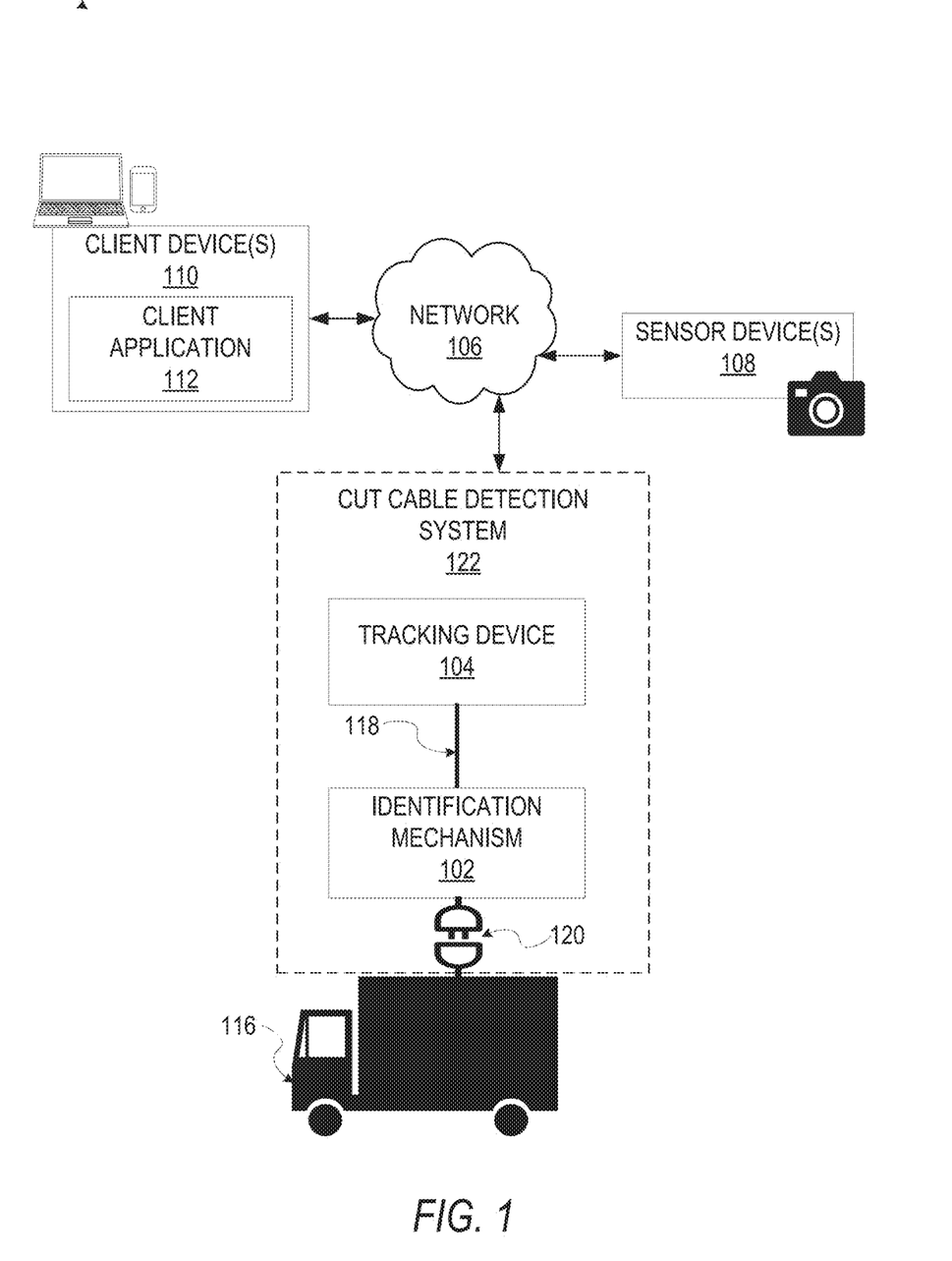
FIG. 1 is a block diagram showing an example system for exchanging data (e.g., sensor data and associated content) over a network in accordance with some embodiments, wherein the system includes a cut cable detection system.

FIG. 1 is a block diagram showing an example system 100 for detecting cable tampering via a displaced identification mechanism, according to certain example embodiments. The system 100 includes one or more client devices 110 that host a number of applications including a client application 112. The client devices 110 and other systems communicate over a network 106.

The network 106 may include any type of communications network including but not limited to the Internet, cellular networks, wireless data networks, WiFi networks, satellite networks, and local area networks (LAN). The network provides the communication medium and infrastructure to allow connectivity and data transfer between the client devices 110, tracking device 104, asset 116, sensors 108, and any servers or cloud services for data storage/processing.

In some embodiments, the system 100 may include a cut cable detection system 122, wherein the cut cable detection system 122 may include: a tracking device 104; a cable 118 that connects the tracking device 104 with an asset 116 via a connector 120; and an identification mechanism 102, wherein the identification mechanism 102 is situated at a distal end of the cable 118 relative to the tracking device 104.

In some embodiments, the system may include one or more sensor devices 108, which include: cameras; resistive sensors; continuity testers; inertial measurement units with accelerometers, gyroscopes, and magnetometers to detect unexpected motion, vibration, and orientation changes indicative of tampering; microphones; voltage monitors to detect power anomalies like unexpected drops in supply voltage; and strain gauges to detect stress, tension, or mechanical deformation from the cable, which may be indicative of tampering.

Accordingly, in certain embodiments, sensor data generated by one or more of the sensor devices 108 may be monitored and analyzed for patterns, thresholds, or signatures indicative of cable and identification mechanism tampering. When such triggers are detected, the system 100 may initiate an immediate check for the presence and validity of the identification mechanism.

Figure 2:
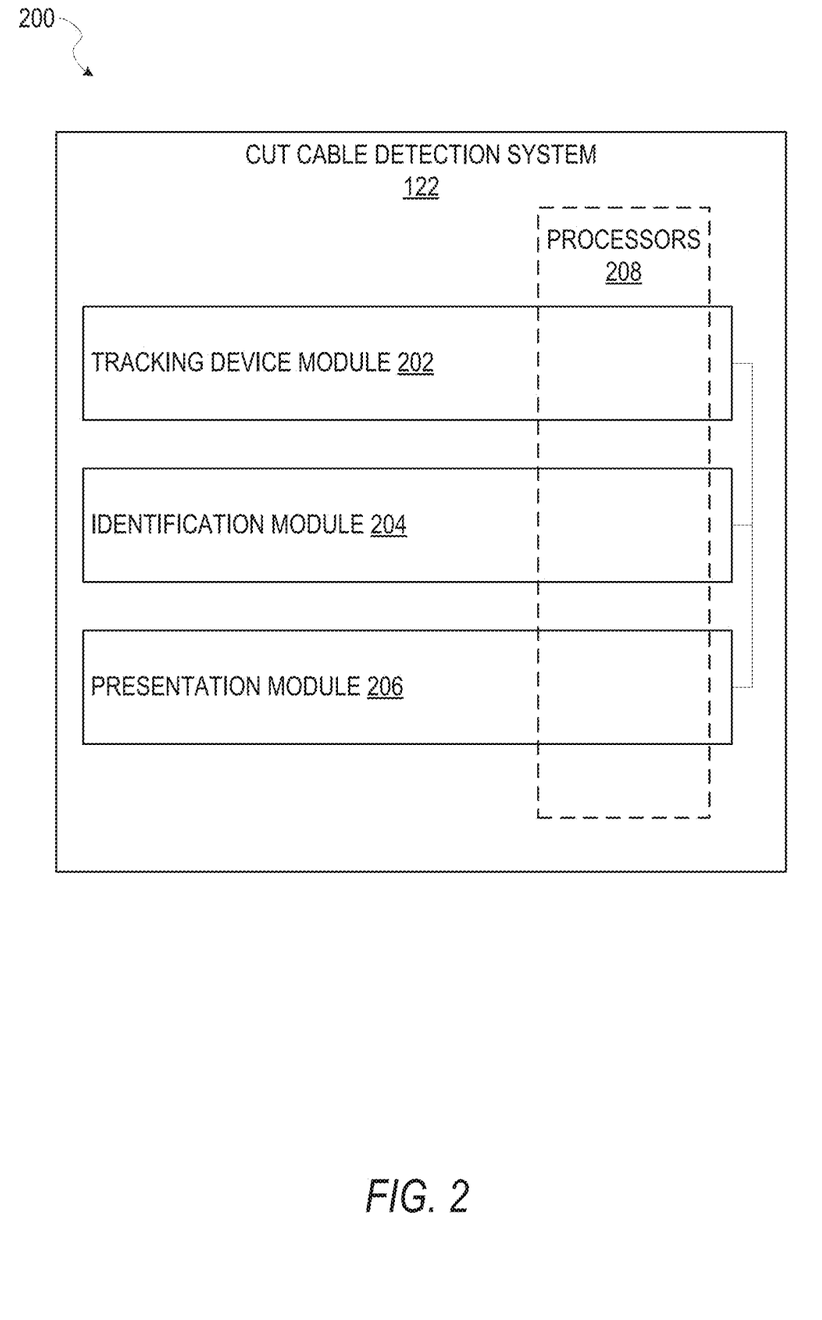
FIG. 2 is a block diagram illustrating various modules of a cut cable detection system, according to certain example embodiments.

FIG. 2 is a block diagram 200 illustrating components of the cut cable detection system 122 that configure the cut cable detection system 122 to detect cable tampering via a displaced identification mechanism, according to some example embodiments.

The cut cable detection system 122 is shown as including a tracking device module 202, an identification module 204, and a presentation module 206, all configured to communicate with each other (e.g., via a bus, shared memory, or a switch). Any one or more of these modules may be implemented using one or more processors 208 (e.g., by configuring such one or more processors to perform functions described for that module) and hence may include one or more of the processors 208.

Any one or more of the modules described may be implemented using hardware alone (e.g., one or more of the processors 208 of a machine) or a combination of hardware and software. For example, any module described of the cut cable detection system 122 may physically include an arrangement of one or more of the processors 208 (e.g., a subset of or among the one or more processors of the machine) configured to perform the operations described herein for that module. As another example, any module of the cut cable detection system 122 may include software, hardware, or both, that configure an arrangement of one or more processors 208 (e.g., among the one or more processors of the machine) to perform the operations described herein for that module.

Accordingly, different modules of the cut cable detection system 122 may include and configure different arrangements of such processors 208 or a single arrangement of such processors 208 at different points in time. Moreover, any two or more modules of the cut cable detection system 122 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The tracking device module 202 interfaces with the physical tracking device 104 hardware. It manages power delivery to the tracking device and asset 116 across the cable 118. The module 202 also controls built-in sensors for motion, orientation, audio, temperature, and voltage monitoring. Collected sensor data is processed and analyzed for signs of tampering activity.

In certain embodiments, when the tracking device module 202 may be configured to detect suspicious sensor patterns or events, and to activate the identification module 204. The identification module 204 handles communication across the cable 118 to interrogate the identification mechanism 102 at the distal end of the cable 118 depicted in FIG. 1. It detects the type of identification apparatus present via resistive, capacitive, visual, or digital means. A missing identification response triggers a tamper alert which may include a notification.

The presentation module 206 manages outbound notifications from the cut cable detection system 122 to one or more client devices 110 when tampering is detected. It transmits alerts over network 106 to application dashboards, mobile clients 112, or in-cab displays. The presentation module 206 formats alerts, status messages, and indication of a compromised identification mechanism 102 for easy human interpretation across various user interfaces.

Figure 3:
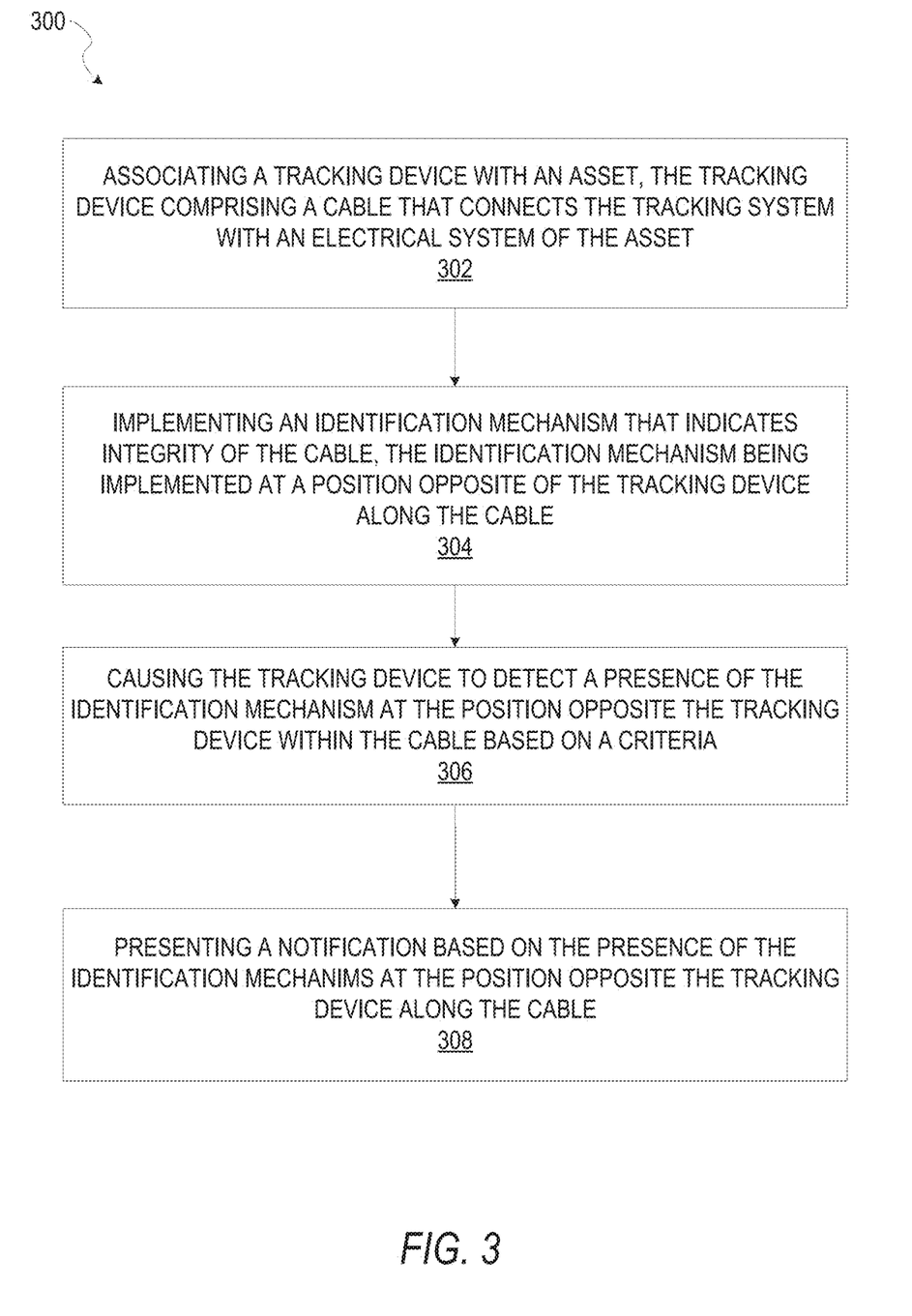
FIG. 3 is a flowchart depicting a method for detecting cable tampering via a displaced identification mechanism, according to certain example embodiments.

FIG. 3 is a flowchart depicting a method 300 for detecting cable tampering via a displaced identification mechanism, according to certain example embodiments. Operations of the method 300 may be performed by the modules described above with respect to FIG. 2. As shown in FIG. 3, the method 300 includes one or more operations 302, 304, 306, and 308.

At operation 302, the cut cable detection system 122 associates a tracking device with an asset being monitored, with the tracking device connected to the asset's electrical system via an interfacing cable. The cable provides pathways for power, data communications, and control between the asset and tracking device during normal operation.

At operation 304, an identification mechanism, including but not limited to a resistor, integrated circuit, or microcontroller, are implemented at the distal end of the cable relative to the tracking device. This identification mechanism can be detected electronically by circuitry within the tracking device and is used to identify the presence of the cable on the asset and validate cable integrity.

At operation 306, the tracking device is configured to continually or periodically check for presence of the identification mechanism at the expected cable endpoint based on criteria such as elapsed time or triggering sensor events. A missing identification mechanism suggests likely cable tampering.

Finally, operation 308 includes transmitting notifications to centralized dashboards, mobile clients, or in-cab displays if the identification mechanism is determined to be absent without expectation. Alerting users and administrators of likely cable tampering events allows rapid response and mitigation.

In certain embodiments, the identification mechanism may be a simple resistor, integrated circuit, or microcontroller, with known resistive, capacitive, or digital signatures respectively identifiable by the tracking device circuitry.

In some embodiments, determination of a missing identification mechanism may be supplemented with data from various sensors on the tracking device or cable, like motion sensors, microphones, voltage monitors etc. to reduce false positives and better deduce tampering events.

Figure 4:
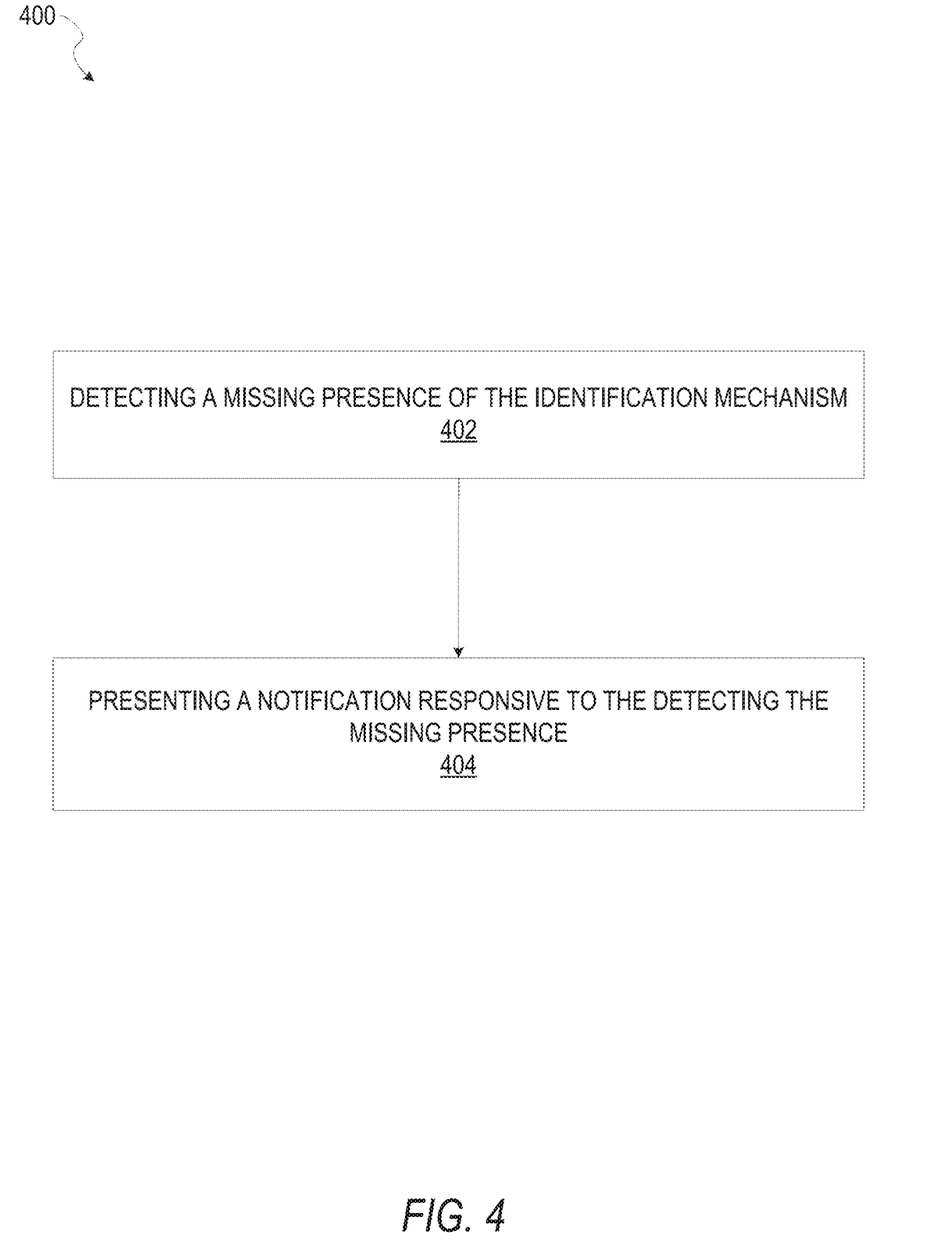
FIG. 4 is a flowchart depicting a method for generating alerts responsive to detection of a cut cable, according to certain example embodiments.

FIG. 4 is a flowchart depicting a method 400 for generating alerts responsive to detection of a cut cable, according to certain example embodiments. Operations of the method 400 may be performed by the modules described above with respect to FIG. 2. In some embodiments, the method 400 may be performed as a precursor or subroutine of operation 308 of the method 300 depicted in FIG. 3. As shown in FIG. 4, the method 400 includes one or more operations 402, and 404.

At operation 402, the tracking device fails to detect the presence of the identification mechanism situated at the distal end of the connecting cable, away from the tracking device electronics. This indicates that the cable has been cut or disconnected between the asset and tracker, separating the identification mechanism from detection circuitry.

With loss of this expected identification mechanism, operation 404 involves transmitting notifications to centralized dashboards, mobile clients, in-cab displays, or other user interfaces. Alert contents may include asset ID, tracking device ID, timestamp, geo-location of last valid fix, and details on the type of identification mechanism being used.

In certain embodiments, the alert notifications may be transmitted via cellular, satellite, WiFi, or other wireless means to reach client devices and update graphical dashboards. Email, SMS, and push notifications to mobile devices may also be utilized for urgent tampering alerts.

Additionally at operation 404, upon detection of a missing identification mechanism, backup battery systems within the tracking device may be activated to maintain position fixes and data connectivity for an extended duration after cable severing events. This provides additional recent asset location data to aid recovery.

Figure 5:
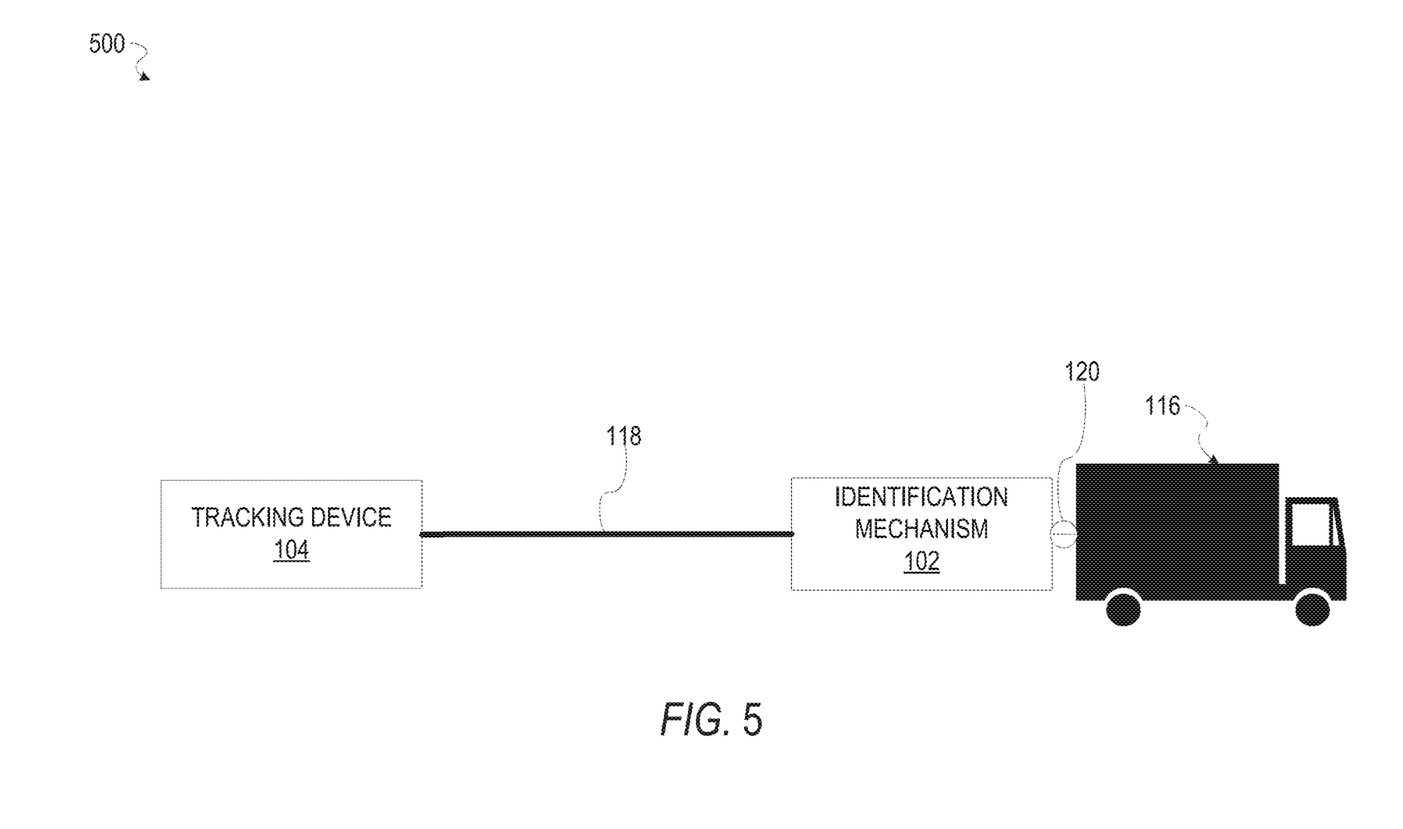
FIG. 5 is a diagram depicting components of a cable tamper detection system according to example embodiments, according to certain example embodiments.

FIG. 5 illustrates a diagram 500 depicting components of a cable tamper detection system 122 according to example embodiments. The system leverages an identification mechanism 102 situated distally along a connecting cable 118 to determine likely cutting or severing events.

A tracking device 104 is associated with an asset 116 being monitored, such as a trailer, container, vehicle, or other movable equipment. The tracking device 104 attaches to the electrical system of the asset 116 via cable 118 and connector 120.

The identification mechanism 102 serves dual purposes. Firstly, in some embodiments, the identification mechanism 102 may provide an identifier that allows the tracking device 104 to identify the specific asset 116 that the cable 118 is connected to by providing a unique resistive, capacitive, or digital asset identifier signature. This properly associates collected tracking data with the corresponding asset 116. In some embodiments, the identification mechanism 102 may provide an indication of a presence of the cable, ensuring cable integrity and that the cable has not been severed.

Secondly, by continually validating presence of the identification mechanism 102 at the expected cable endpoint, the tracking device 104 can determine if tampering entities have likely physically cut or disconnected the cable 118. A missing identification mechanism 102 suggests the cable has been intentionally severed between the asset 116 and tracker 104.

In certain embodiments, the identification mechanism 102 may provide a fixed asset identification value. In other embodiments, the mechanism 102 may actively transmit asset serial numbers, VINs, container numbers, or other programmable ID data upon request by the tracking device 104.

Responsive to an absent identification mechanism 102, the tracking device 104 transmits notifications to inform users, administrators, authorities, and other systems about the likely tampering event. Identification mechanism displacement from cable severing is an early indicator of asset interference and theft attempts.

Figure 6:
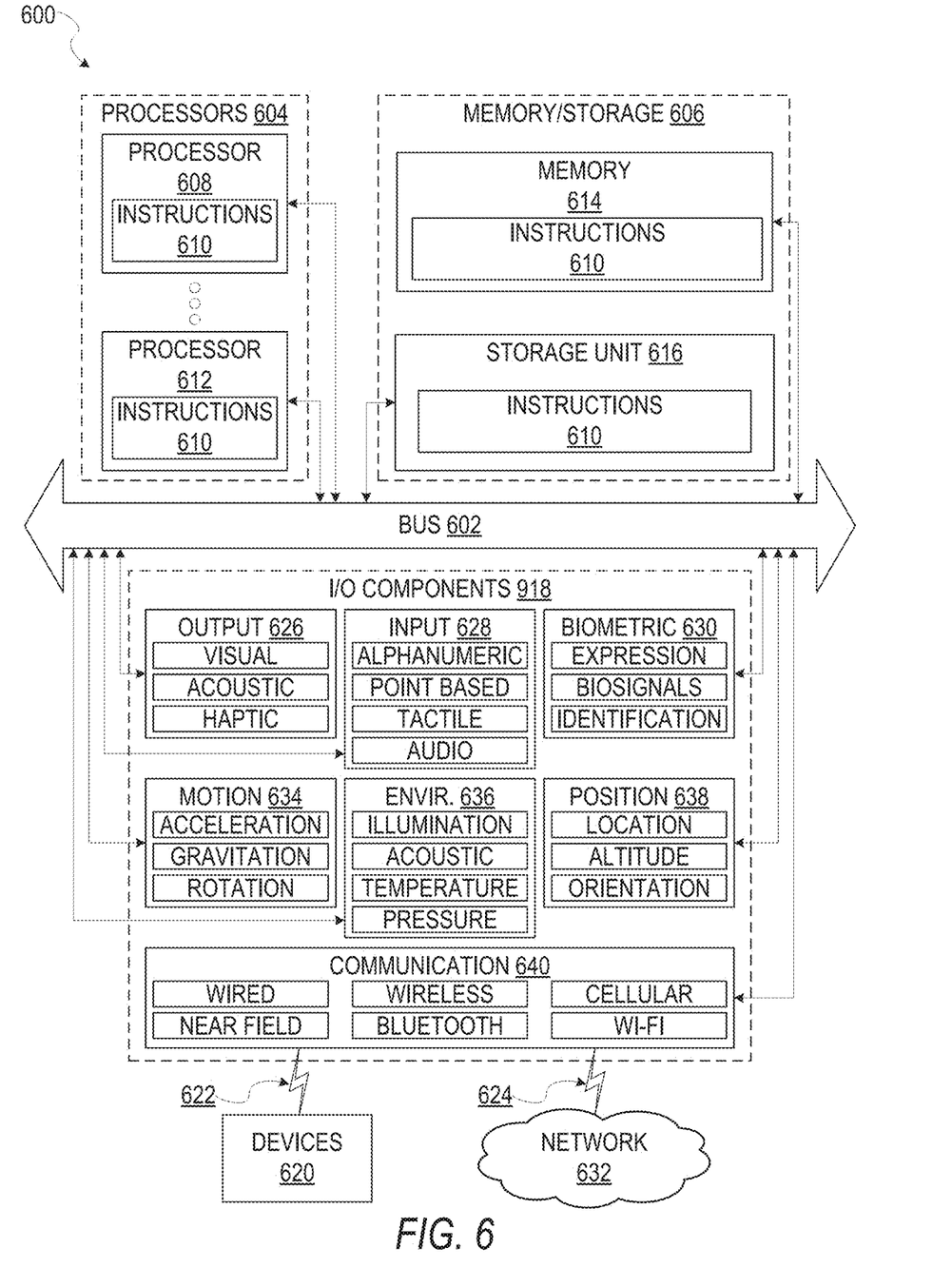
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. As such, the instructions 610 may be used to implement modules or components described herein. The instructions 610 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 610, sequentially or otherwise, that specify actions to be taken by machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604, memory memory/storage 606, and I/O components 618, which may be configured to communicate with each other such as via a bus 602. The memory/storage 606 may include a memory 614, such as a main memory, or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of processors 604 are examples of machine-readable media.

The I/O components 618 may include a wide variety of components to receive input, provide output, produce output, transmit information, exchange information, capture measurements, and so on. The specific I/O components 618 that are included in a particular machine 600 will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion and the grouping is in no way limiting. In various example embodiments, the I/O components 618 may include output components 626 and input components 628. The output components 626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environmental environment components 636, or position components 638 among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 634 may include acceleration sensor components (e.g., accelerometer), gravitation sensor components, rotation sensor components (e.g., gyroscope), and so forth. The environment components 636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 638 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via coupling 622 and coupling 624 respectively. For example, the communication components 640 may include a network interface component or other suitable device to interface with the network 632. In further examples, communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a Universal Serial Bus (USB)).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"NON-TRANSITORY" in this context refers to a medium or storage that retains data for a period of time sufficient to allow for the access and execution of computer-readable instructions, software, or digital content contained therein. This term is used to distinguish such media from purely transient signals, which are not capable of being captured, stored, and directly manipulated. Non-transitory media may include, but are not limited to, hard drives, solid-state drives, optical discs, flash memory, RAM, ROM, and other forms of persistent memory.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:
   associating a tracking device with an asset, the tracking device comprising a cable that connects the tracking device with an electrical system of the asset;
   implementing an identification mechanism that identifies the cable at a position opposite of the tracking device within the cable that connects the tracking device to the electrical system of the asset;
   causing the tracking device to perform a check for a presence of the identification mechanism at the position opposite the tracking device within the cable at a periodic time interval; and
   presenting a notification based on a result of the check for the presence of the identification mechanism at the position opposite the tracking device within the cable.

2. The method of claim 1, wherein the identification mechanism comprises one or more of:
   a resistor identifier;
   a chip identifier; and
   a microcontroller.

3. The method of claim 1, wherein the presence includes a missing presence of the identification mechanism, and wherein the presenting the notification includes:
   presenting the notification at a client device responsive to detecting the missing presence of the identification mechanism at the position within the cable.

4. The method of claim 1, wherein the presence includes a missing presence of the identification mechanism, and wherein the presenting the notification includes causing display of an indication of the missing presence at a client device.

5. The method of claim 1, wherein the presence includes a missing presence of the identification mechanism, and wherein the method further comprises:
   causing the tracking device to activate a battery backup system associated with the tracking device.

6. The method of claim 1, wherein the asset comprises one or more of a vehicle trailer, or a shipping container.

7. The method of claim 1, wherein the position of the identification mechanism is at a furthest point along the cable away from the tracking device.

8. A system comprising:
   a memory;
   an identification mechanism;
   a tracking device;
   at least one hardware processor to perform operations comprising:
   associating the tracking device with an asset, the tracking device comprising a cable that connects the tracking device with an electrical system of the asset;
   implementing the identification mechanism that identifies the cable at a position opposite of the tracking device within the cable that connects the tracking device to the electrical system of the asset;
   causing the tracking device to perform a check for a presence of the identification mechanism at the position opposite the tracking device within the cable at a periodic time interval; and
   presenting a notification based on a result of the check for the presence of the identification mechanism at the position opposite the tracking device within the cable.

9. The system of claim 8, wherein the identification mechanism comprises one or more of:
   a resistor identifier;
   a chip identifier; and
   a microcontroller.

10. The system of claim 8, wherein the presence includes a missing presence of the identification mechanism, and wherein the presenting the notification includes:
   presenting the notification at a client device responsive to detecting the missing presence of the identification mechanism at the position within the cable.

11. The system of claim 8, wherein the presence includes a missing presence of the identification mechanism, and wherein the presenting the notification includes causing display of an indication of the missing presence at a client device.

12. The system of claim 8, wherein the presence includes a missing presence of the identification mechanism, and wherein the method further comprises:
   causing the tracking device to activate a battery backup system associated with the tracking device.

13. The system of claim 8, wherein the asset comprises one or more of a vehicle trailer, or a shipping container.

14. The system of claim 8, wherein the position of the identification mechanism is at a furthest point along the cable away from the tracking device.

15. A non-transitory machine-readable storage medium comprising instructions that, when executed by one or more processors of a machine, cause the machine to perform operations comprising:
   associating a tracking device with an asset, the tracking device comprising a cable that connects the tracking device with an electrical system of the asset;
   implementing an identification mechanism that identifies the cable at a position opposite of the tracking device within the cable that connects the tracking device to the electrical system of the asset;
   causing the tracking device to perform a check for a presence of the identification mechanism at the position opposite the tracking device within the cable at a periodic time interval; and
   presenting a notification based on a result of the check for the presence of the identification mechanism at the position opposite the tracking device within the cable.

16. The non-transitory machine-readable storage medium of claim 15, wherein the identification mechanism comprises one or more of:
   a resistor identifier;
   a chip identifier; and
   a microcontroller.

17. The non-transitory machine-readable storage medium of claim 15, wherein the presence includes a missing presence of the identification mechanism, and wherein the presenting the notification includes:
   presenting the notification at a client device responsive to detecting the missing presence of the identification mechanism at the position within the cable.

18. The non-transitory machine-readable storage medium of claim 15, wherein the presence includes a missing presence of the identification mechanism, and wherein the presenting the notification includes causing display of an indication of the missing presence at a client device.

19. The non-transitory machine-readable storage medium of claim 15, wherein the presence includes a missing presence of the identification mechanism, and wherein the method further comprises:
   causing the tracking device to activate a battery backup system associated with the tracking device.

20. The non-transitory machine-readable storage medium of claim 15, wherein the asset comprises one or more of a vehicle trailer, or a shipping container.

* * * * *